US008966369B2

(12) United States Patent
Worthen

(10) Patent No.: US 8,966,369 B2
(45) Date of Patent: Feb. 24, 2015

(54) HIGH QUALITY SEMI-AUTOMATIC PRODUCTION OF CUSTOMIZED RICH MEDIA VIDEO CLIPS

(75) Inventor: Billie C. Worthen, Minnetonka, MN (US)

(73) Assignee: Unity Works! LLC, Edina, MN (US)

( * ) Notice: Subject to any disclaimer, the term of this patent is extended or adjusted under 35 U.S.C. 154(b) by 613 days.

(21) Appl. No.: 11/753,412

(22) Filed: May 24, 2007

(65) Prior Publication Data

US 2008/0292265 A1    Nov. 27, 2008

(51) Int. Cl.
*G11B 27/34*      (2006.01)
*G11B 27/034*    (2006.01)
*G11B 27/10*      (2006.01)

(52) U.S. Cl.
CPC ............ *G11B 27/034* (2013.01); *G11B 27/105* (2013.01); *G11B 27/34* (2013.01)
USPC ........................................................ 715/719

(58) Field of Classification Search
CPC .................... G06F 17/30787; G06F 17/30796; G06F 17/30058
USPC .................... 707/E17.009, E17.028, 914, 913
See application file for complete search history.

(56) References Cited

U.S. PATENT DOCUMENTS

| | | |
|---|---|---|
| 5,263,869 A | 11/1993 | Ziv-El |
| 5,493,490 A | 2/1996 | Johnson |
| 5,793,365 A | 8/1998 | Tang et al. |
| 5,801,685 A | 9/1998 | Miller et al. |
| 5,862,346 A | 1/1999 | Kley et al. |
| 5,878,214 A | 3/1999 | Gilliam et al. |
| 5,956,491 A | 9/1999 | Marks |
| 5,974,446 A | 10/1999 | Sonnenreich et al. |
| 5,999,968 A | 12/1999 | Tsuda |
| 6,075,768 A | 6/2000 | Mishra |
| 6,088,702 A | 7/2000 | Plantz et al. |
| 6,119,147 A | 9/2000 | Toomey et al. |
| 6,154,771 A | 11/2000 | Rangan et al. |
| 6,209,100 B1 | 3/2001 | Robertson et al. |

(Continued)

FOREIGN PATENT DOCUMENTS

| | | |
|---|---|---|
| WO | WO 01/58131 A2 | 8/2001 |
| WO | WO 2004/063840 A2 | 7/2004 |

OTHER PUBLICATIONS

Kim, Amy Jo; "Community Building on the Web"; 2000: Peachpit Press; Chapters 1 and 2.

(Continued)

*Primary Examiner* — James Trujillo
*Assistant Examiner* — Soheila Davanlou
(74) *Attorney, Agent, or Firm* — McDermott Will & Emery LLP

(57) ABSTRACT

A method and system for the high quality semi-automatic production of customized rich media video clips is disclosed. Media source material, such as text, graphics, pictures, and video clips can be submitted by a customer. A computerized content aggregator utilizing an automated production assistant can locate additional source material by searching available information libraries and databases. The computerized content aggregator may be programmed to organize and assemble the various source materials to create suggested video elements and a suggested voice-over script or recording. A human video producer can then quickly and efficiently create a rich media video clip from the suggested video elements and the voice-over script or recording.

9 Claims, 20 Drawing Sheets

(56) References Cited

U.S. PATENT DOCUMENTS

| | | |
|---|---|---|
| 6,223,165 B1 | 4/2001 | Lauffer |
| 6,332,175 B1 | 12/2001 | Birrell et al. |
| 6,421,726 B1 | 7/2002 | Kenner et al. |
| 6,496,856 B1 | 12/2002 | Kenner et al. |
| 6,546,188 B1 | 4/2003 | Ishii et al. |
| 6,581,075 B1 | 6/2003 | Guturu et al. |
| 6,643,663 B1 | 11/2003 | Dabney et al. |
| 6,654,930 B1 | 11/2003 | Zhou et al. |
| 6,677,981 B1 | 1/2004 | Mancuso et al. |
| 6,694,200 B1 | 2/2004 | Naim |
| 6,701,343 B1 | 3/2004 | Kenyon |
| 6,732,101 B1 | 5/2004 | Cook |
| 6,760,916 B2 | 7/2004 | Holtz et al. |
| 6,985,934 B1 | 1/2006 | Armstrong et al. |
| 7,302,696 B1 | 11/2007 | Yamamoto |
| 7,313,810 B1* | 12/2007 | Bell et al. ............... 725/116 |
| 7,346,656 B2 | 3/2008 | Worthen |
| 7,610,358 B2* | 10/2009 | Benschoter et al. ......... 709/219 |
| 7,870,577 B2 | 1/2011 | Haberman et al. |
| 8,032,427 B1 | 10/2011 | Spreen et al. |
| 2001/0029501 A1 | 10/2001 | Yokobori et al. |
| 2001/0056469 A1 | 12/2001 | Oonuki |
| 2002/0010794 A1 | 1/2002 | Stanbach, Jr. et al. |
| 2002/0023018 A1 | 2/2002 | Kleinbaum |
| 2002/0023132 A1 | 2/2002 | Tornabene et al. |
| 2002/0029179 A1 | 3/2002 | Gruber et al. |
| 2002/0034255 A1* | 3/2002 | Zetts ................ 375/240.26 |
| 2002/0038299 A1 | 3/2002 | Zernik et al. |
| 2002/0054244 A1* | 5/2002 | Holtz et al. ............ 348/722 |
| 2002/0055892 A1* | 5/2002 | Brown et al. ............ 705/27 |
| 2002/0056119 A1 | 5/2002 | Moynihan |
| 2002/0062250 A1 | 5/2002 | Nagano et al. |
| 2002/0063732 A1 | 5/2002 | Mansikkaniemi et al. |
| 2002/0073026 A1 | 6/2002 | Gruber et al. |
| 2002/0077839 A1 | 6/2002 | Siegel et al. |
| 2002/0091538 A1 | 7/2002 | Schwartz et al. |
| 2002/0091725 A1 | 7/2002 | Skok |
| 2002/0099654 A1 | 7/2002 | Nair |
| 2002/0129089 A1 | 9/2002 | Hegde et al. |
| 2002/0169797 A1* | 11/2002 | Hegde et al. ............ 707/500.1 |
| 2002/0175917 A1 | 11/2002 | Chakravarty et al. |
| 2003/0049591 A1* | 3/2003 | Fechter ................ 434/307 A |
| 2003/0061114 A1 | 3/2003 | Schwartz et al. |
| 2003/0167449 A1 | 9/2003 | Warren et al. |
| 2003/0182371 A1 | 9/2003 | Worthen |
| 2003/0191816 A1 | 10/2003 | Landress et al. |
| 2003/0200145 A1 | 10/2003 | Krassner et al. |
| 2003/0214538 A1* | 11/2003 | Farrington et al. ......... 345/854 |
| 2003/0225613 A1 | 12/2003 | Shahoumian et al. |
| 2004/0019648 A1 | 1/2004 | Huynh et al. |
| 2004/0226048 A1 | 11/2004 | Alpert et al. |
| 2005/0027696 A1* | 2/2005 | Swaminathan et al. ......... 707/3 |
| 2005/0144302 A1* | 6/2005 | Kirkpatrick et al. ......... 709/231 |
| 2005/0195076 A1 | 9/2005 | McCulloch et al. |
| 2005/0240433 A1 | 10/2005 | Schwartz et al. |
| 2005/0240596 A1* | 10/2005 | Worthen et al. .......... 707/10 |
| 2005/0251461 A1* | 11/2005 | Nykamp .............. 705/27 |
| 2005/0256780 A1 | 11/2005 | Eldred |
| 2005/0256941 A1 | 11/2005 | Armstrong et al. |
| 2006/0026067 A1 | 2/2006 | Nicholas et al. |
| 2006/0026655 A1 | 2/2006 | Perez |
| 2006/0168064 A1 | 7/2006 | Huynh et al. |
| 2006/0271947 A1* | 11/2006 | Lienhart et al. ............ 725/19 |
| 2007/0112676 A1 | 5/2007 | Kontio et al. |
| 2007/0162542 A1 | 7/2007 | Lawrence et al. |
| 2007/0168193 A1* | 7/2007 | Aaron et al. ............ 704/260 |
| 2007/0189708 A1* | 8/2007 | Lerman et al. ............ 386/52 |
| 2007/0204064 A1* | 8/2007 | Mail et al. ............ 709/246 |
| 2007/0282819 A1* | 12/2007 | Lynn et al. ............ 707/3 |
| 2008/0082410 A1 | 4/2008 | Zhou et al. |
| 2008/0092193 A1* | 4/2008 | Lee et al. ............ 725/123 |
| 2008/0098301 A1* | 4/2008 | Black et al. ............ 715/246 |
| 2008/0141307 A1 | 6/2008 | Whitehead |
| 2008/0222012 A1 | 9/2008 | Murthy |
| 2008/0295130 A1 | 11/2008 | Worthen |
| 2009/0196570 A1* | 8/2009 | Dudas et al. ............ 386/52 |

OTHER PUBLICATIONS

Website Print-Out; Intranet News, http://intranetjournal.com, 3 pgs.; Sep. 2002.

PCT International Search Report for PCT/US2008/064905, 2 pages.

Vendaria Envision Video E-mail, www.vendaria.com/solution/vmail, Jan. 21, 2004.

"Vendaria: Paving the Future of Web Marketing by Video", L. Sivitz, www.seattle24x7.com/up/vendaria.htm, Jul. 9, 2004.

Edmunds.com Photos and Video www.edmunds.com/used/2005/audi/at/100415318/photos.html, Dec. 8, 2005.

CarsDirect—How Does it Work, www.carsdirect.com/the_company/how_cdc_works, Dec. 8, 2005.

CarsDirect—Used Cars, www.carsdirect.com/used-cars/search, Dec. 8, 2005.

Kia—www.kia.com/amanti/amanti-views-flash.php, Dec. 8, 2005.

Autobytel.com—www.autobytel.com/content/research;vir/index.cfm/action/media;series-id.int/38677/media/photo, Dec. 8, 2005.

Streaming21.com—www.streaming21.com/xpdf/streaming21_platfom.pdg, Dec. 8, 2005.

United States Office Action issued in U.S. Appl. No. 11/999,523 dated Jun. 10, 2010.

Markus Hinz: "Online Advertising: Maximierung des Return on Advertising (ROA) unter Anwendung der acht Online-Advertising-Prinzipien", Sep. 26, 2006, pp. FP, 1-20, XP002614741, Praxishandbuch Internationales Marketing.

Supplementary European Search Report issued in European Patent Application No. EP 08 75 6320, dated Feb. 1, 2011.

US Office Action issued in U.S. Appl. No. 11/999,523 dated Jul. 5, 2012.

United States Office Action issued in U.S. Appl. No. 11/999,523 dated Jan. 31, 2013.

Non-Final Office Action U.S. Appl. No. 14/250,049 dated Aug. 4, 2014.

Final Office Action U.S. Appl. No. 14/250,049 dated Nov. 24, 2014.

\* cited by examiner

FIG. 4

Send Your Pictures

Enter a name for your photo album

[Jimmy D Auto] [+ ADD NEW ALBUM]

Select your photos
The total size of your selected files may not exceed 5 MB per upload
The maximum number of files per upload is 10

[Browse...]

These are the pictures to add to your Photo Album
[Photo Album] [Image Name] [Action]

☐ Your selected Photo Album

These are the pictures currently in your Photo Album

| | Photo Album | Image Name | Action |
|---|---|---|---|
| 1 | Jimmy D Auto | 6330698730724520006_16141_1.jpg | ☐ Remove |
| 2 | Jimmy D Auto | 6330698730724520005_16229_1.jpg | ☐ Remove |
| 3 | Jimmy D Auto | 6330698730724520008_16683_1.jpg | ☐ Remove |
| 4 | Jimmy D Auto | 6330698730722957758_17099_1.jpg | ☐ Remove |

Click Next to continue
[Update] [Delete My Album]

◄ PREVIOUS                                    NEXT ►

LeftPane | ContentPane | RightPane

BottomPane

Main | Tools | Customer Support | Training | News | Sales | Employee Content | Contact Us | Register | Contact | Admin

FIG. 7

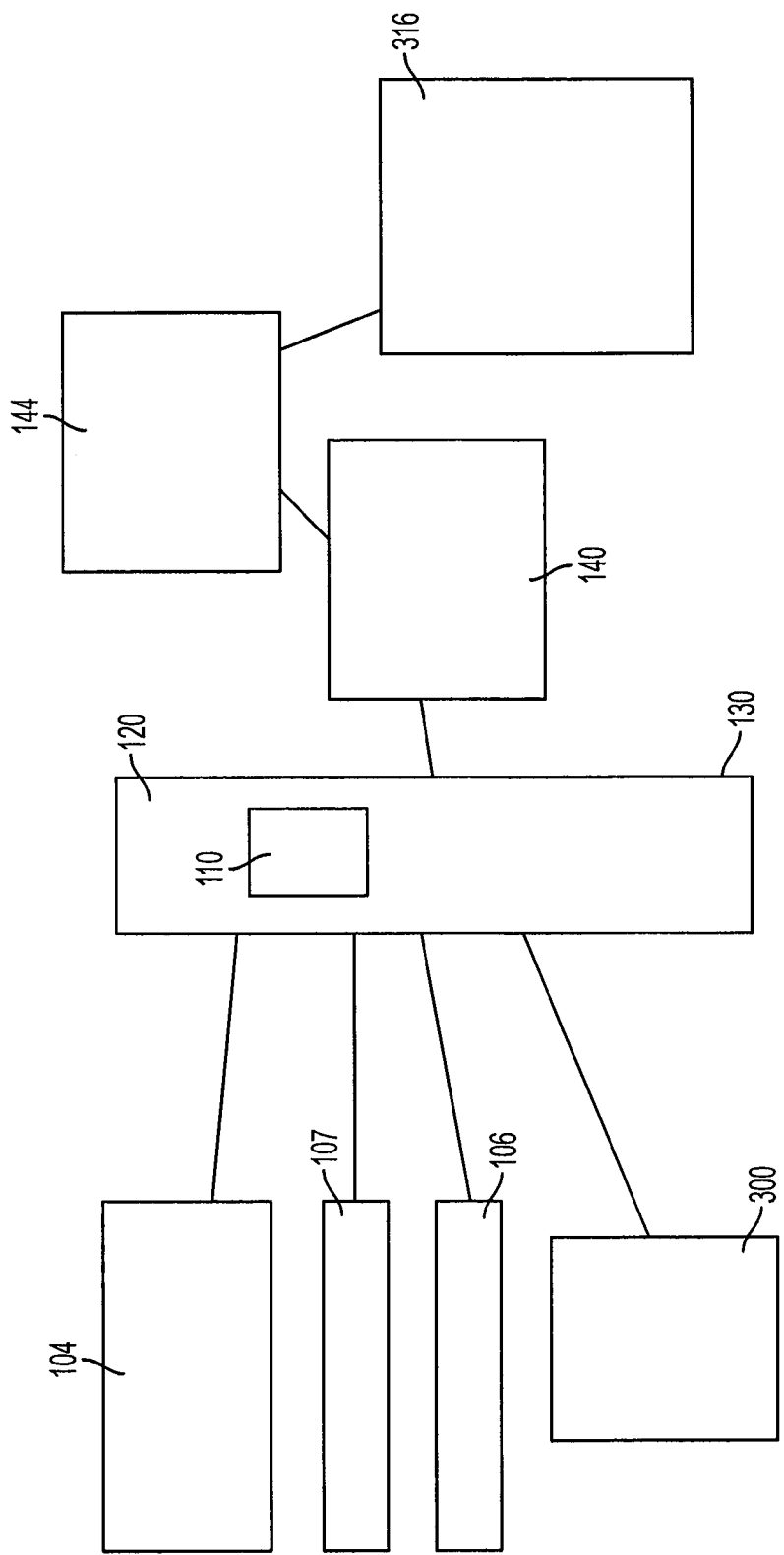

HIGH QUALITY SEMI-AUTOMATIC PRODUCTION OF CUSTOMIZED RICH MEDIA VIDEO CLIPS

FIELD OF THE INVENTION

The present invention relates generally to the generation and production of video advertisements to be presented via the Internet. More particularly, the present invention relates to a method and apparatus for high quality mass production of customized video clips for the promotion of products and services.

BACKGROUND OF THE INVENTION

The Internet has become an increasingly important part of the sales industry. Today, many buyers perform some kind of online research prior to making purchases. Not surprisingly, Internet advertising has steadily increased as a percentage of all advertising.

Developments such as these have spawned an entire industry that specializes in providing services relating to the creation and dissemination of advertising content. These kinds of business generally use the Internet infrastructure to some degree.

As the number of buyers and sellers using the Internet increases, the amount of product related information available on the Internet has proliferated. Most of this information is relatively undifferentiated, necessitating considerable time and effort on the potential buyer's part to tease out the information he or she seeks. One way to differentiate a given seller is to create advertisements that stand out from the crowd or increase the amount of time that is spent at the seller's web site so as to improve the chances of making a sale to the web visitor.

While customized audiovisual advertisements are known to be more attractive and increase the time a potential buyer spends at a website, the costs involved in producing and disseminating high quality, high bandwidth advertisements would be cost prohibitive if professional video production were used. This problem is further compounded when there is a need to efficiently and professionally create a multitude of unique, customized advertisements for the various products being sold by a given seller.

There are several techniques and technologies that make it possible to automate the creation of rich media content and make it possible to create productions involving the real-time display of images and text synchronized to an audio track, for example. These include animation tools (e.g. Flash from Macromedia Inc.), authoring tools for streaming media (e.g. RealPlayer from Real Networks Inc.), digital cameras, video recorders, commercial software packages such as for example, MovingPicture software from StageTools LLC in conjunction with video editors such as Adobe Premiere or Avid Xpress DV.

U.S. Pat. No. 5,801,685 and U.S. Patent Publ. No. 20020175917A1 describe generalized video editing systems for working with streaming media and video clips. U.S. Pat. No. 6,677,981 describes a system for video play-back of a still image with an image generator for generating a panoramic image by stitching together a plurality of images.

Various systems and techniques have been developed to aid in the production of rich media audiovisual content that includes text to be read accompanying the video footage. In the broadcast news editing system described in U.S. Pat. No. 5,801,685, for example, selected video clips are linked to a script text by embedding edit link control sequences into the text at selected points. The control sequences in the script text are linked to an edit decision list (EDL) that defines the video clips that are to be synchronized to the script text. In preparing a news story for broadcast, the EDL is used to generate the video portion of the broadcast with the synchronized text displayed for reading by a news announcer. U.S. Pat. No. 6,654,930 discloses a similar editing system for producing video news footage that displays a sequence of text associated with a sequence of video frames, defining time codes in the text and a reading rate to indicate whether the text matches the video sequence.

It is also known to distribute such rich media content via email. U.S. Patent Publ. No. 20040019648A1 describes a facility for generating and presenting rich media email messages. U.S. Patent Publ. No. 20060168064A1 describes a message management system for creating and/or adapting electronic messages with digital content.

Unfortunately, the learning curve to use these products can be substantial and the amount of time required to produce any given customized video segment is often measured in hours, not minutes. As a result, mass production of customized rich media audiovisual content using skilled operators can be cost prohibitive.

SUMMARY OF THE INVENTION

The present invention is directed to a method and system for high quality semi-automatic production of customized rich media video clips. Media source material, such as text, graphics, pictures, and video clips can be submitted by a customer. A computerized content aggregator utilizing an automated production assistant can locate additional source material by searching available information libraries and databases. The computerized content aggregator may be programmed to organize and assemble the various source materials to create suggested video elements and a suggested voice-over script or recording. A human video producer can then quickly and efficiently create a rich media video clip from the suggested video elements and the voice-over script or recording.

In one aspect of the present disclosure, high quality customized rich media video clips are produced through a semi-autmatic method. Media source material can initially be received over an electronic network. Available electronic information libraries can then be automatically searched for previously produced rich media video clips and rich media video clip components related to the received media source material through an automated process. Commercially available databases can also be searched for database information related to the received media source material through an automated process. The media source material, previously produced rich media video clips and/or rich media video clip components, and database information can then be automatically translated into a suggested voice-over script or recording. Suggested video elements derived from the media source material, previously produced rich media video clips and rich media video clip components, and/or database information can be automatically organized and assembled. A rich media video clip can then be created by a human operator based on the suggested voice-over script or recording and the suggested video elements.

In another aspect of the present disclosure, high quality customized rich media video clips can be produced with a semi-automatic system. The system can include a user interface configured to facilitate the transmission of media source material. A computerized content aggregator can be configured to receive the transmitted media source material. An automated production assistant in communication with the computerized content aggregator can search information libraries for previously produced rich media video clips and rich media video clip components related to the received media source material and one or more commercially available databases for database information related to the received media source material. The automated production assistant can be configured to communicate data to the computerized content aggregator in the form of the previously produced rich media video clips and rich media video clip components and/or database information it located related to the received media source material. The content aggregator can be configured to produce production instructions that include, for example, a suggested voice-over script or recording and also suggest video elements based on the data received from the automated production assistant and the received media source material. A video creation project element file can contain the production instructions and suggested video elements. A user interface can be configured to enable a human operator to utilize the video creation project element file to create a rich media video clip.

The above summary of the various representative embodiments of the invention is not intended to describe each illustrated embodiment or every implementation of the invention. Rather, the embodiments are chosen and described so that others skilled in the art may appreciate and understand the principles and practices of the invention. The figures in the detailed description that follows more particularly exemplify these embodiments.

BRIEF DESCRIPTION OF THE DRAWINGS

FIG. 4 is a screenshot of a file upload page of a user interface according to an embodiment of the present invention.

FIG. 7 is a screenshot of a file upload page of a user interface according to an embodiment of the present invention.

FIG. 20 is a diagram illustrating a method and system for high quality semi-automatic production of customized rich media video clips according to an embodiment of the present invention.

DETAILED DESCRIPTION OF THE INVENTION

Figure 1:
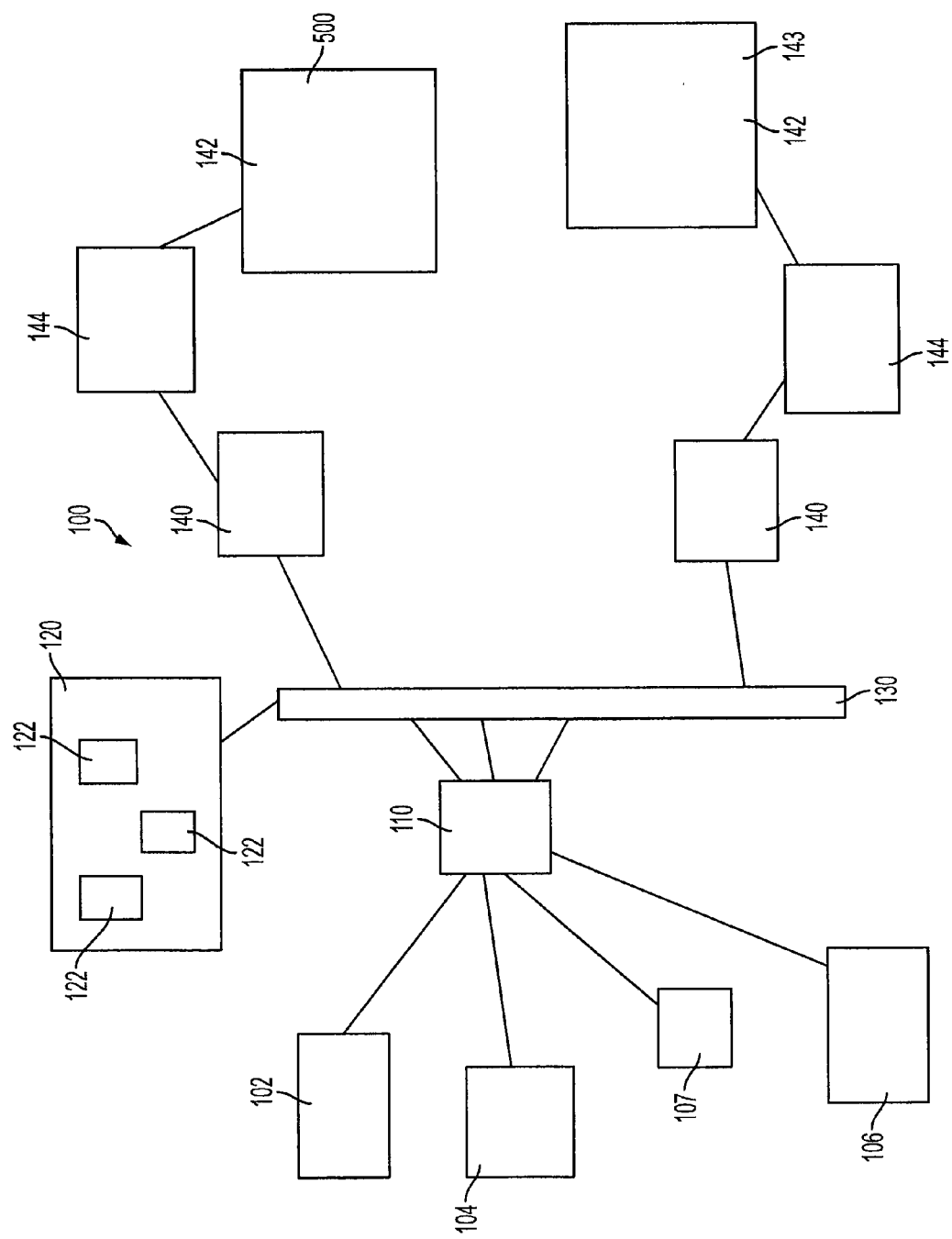
FIG. 1 is a diagram illustrating a method and system for high quality semi-automatic production of customized rich media video clips according to an embodiment of the present invention.

FIG. 1 is a diagram illustrating a method and system 100 for high quality semi-automatic production of customized rich media video clips. Rich media, as the term is used in this invention, may be exemplified by a broad range of digital information consisting of any combination of audio, graphics, video, voice and animation delivered over the Internet or similar networked arrangement of electronic devices. For purposes of this invention, a clip is a set of contiguous frames of a video stream or segment, and each frame is a single, still image taken from a recorded video or video-like animation.

System 100 enables manual or semi-automated mass-customization of rich media by integrating information representing diverse input media source material into a rich media video clip that can be stored at one or more repositories and distributed on-demand over a communication network to one or more end-users situated at widely dispersed geographical locations. The input media source material may include motion video such as video vignettes captured from a camera or camcorder with or without an accompanying soundtrack, digital or digitized still images/photographs, audio such as music or speech and static or animated graphics and text or other formats which may be incorporated into rich media presentations. The rich media video clips are adapted for distribution using traditional and contemporary information transmission channels such as for example, by integration into e-mail, video streaming over the Internet, file-sharing, web-page loading, broadcasting, multicasting and pod-casting Referring again to FIG. 1, production of a rich media clip for a customer by a third party may be initiated by a customer in one of several ways. A customer can place an order for a rich media video clip through a networked user interface, such as via the Internet, at step 102. The customer can upload media source material and instructions for use in creating the rich media video clip via a user interface at step 104. Media source material that may be uploaded include the customer's print ads, TV spots, video clips, or a series of digital pictures. Where a customer has previously uploaded media source material, an order can be placed and a rich media video clip can be produced without the need to upload additional source material. The customer can alternatively upload rich media elements via a direct feed, such as a file transfer protocol (ftp) link, at step 106. The customer then contractually agrees that media source material sent via direct feed will initiate a rich media video clip that will be put into a customer library and onto specified websites for marketing purposes. Media source material can also be transmitted through manual e-mail, snail mail, track, or manual upload track at step 107.

In one embodiment, a "customer" is typically a seller of goods or services. The customer contacts the third party video producer in order to have a rich media video clip promoting one or more of its products developed. The customer can then place the rich media video clip onto its website where it will be viewed by potential purchasers of its products.

Figure 2:
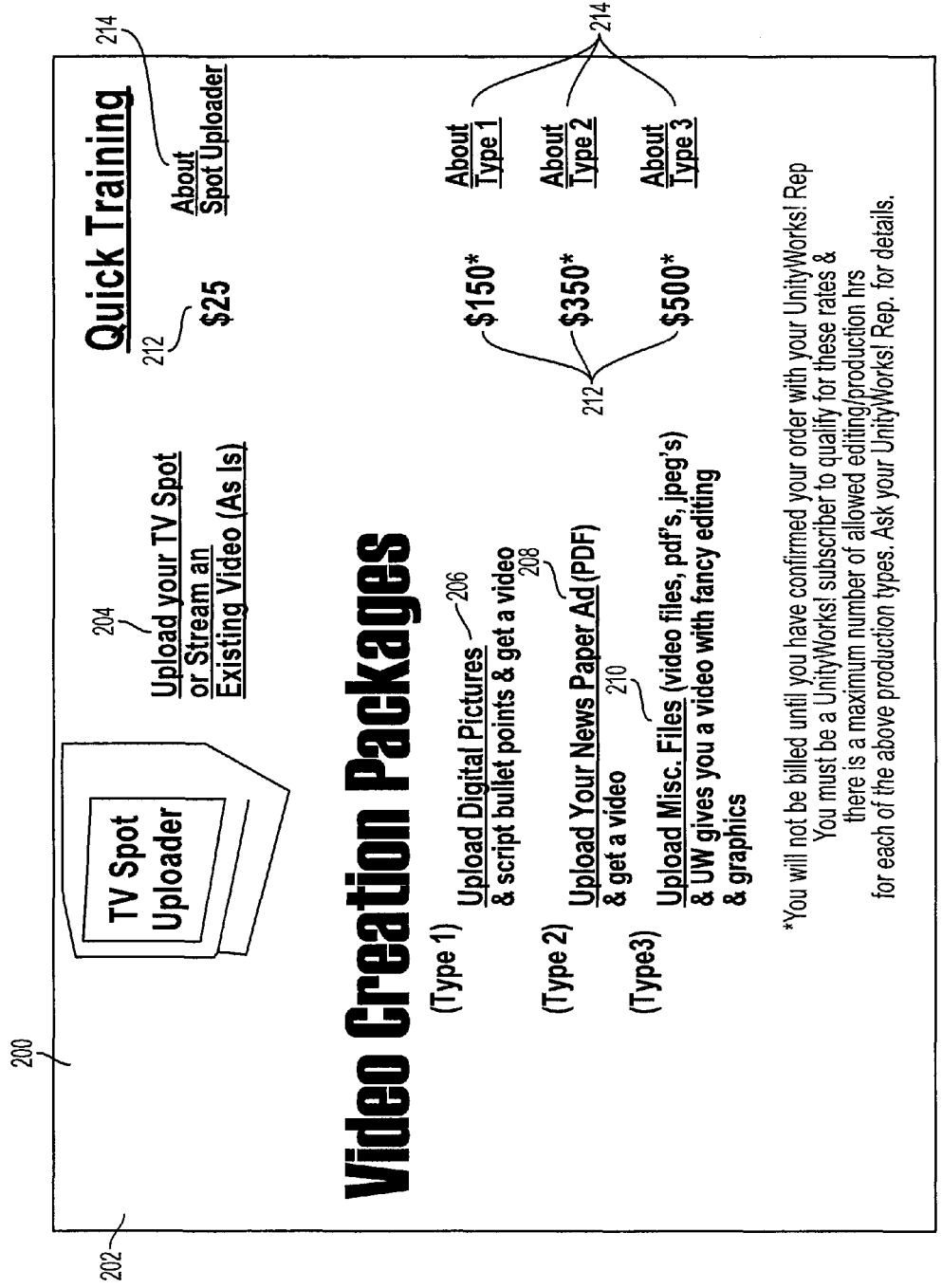
FIG. 2 is a screenshot of an order selection page of a user interface according to an embodiment of the present invention.

FIGS. 2-13 depict screenshots of a user interface 200 which can be used by the customer to upload media source material and instructions. User interface 200 will typically be accessed by a customer on a desktop or laptop computer, but can also be used on any device with a visual display that is capable of communicating over the internet, such as a personal digital assistant or a cellular phone. FIG. 2 depicts an order selection page 202. The order selection page 202 includes links 204, 206, 208, 210 for various services offered by a third party video producer. One link 204 can provide the customer with the option of uploading a TV advertisement or other pre-existing video for display. Other links can be present to provide to allow the customer to choose which type of media source material to upload for creation of a rich media video clip. For example, there can be an upload digital pictures link 206, an upload newspaper ad link 208, and an upload miscellaneous files, such as, for example, video files, pdf's, or jpeg's, link 210. In one embodiment, next to each link there can be a price listing 212 for each service as well as links 214 that describe each service in greater detail.

Figure 3:
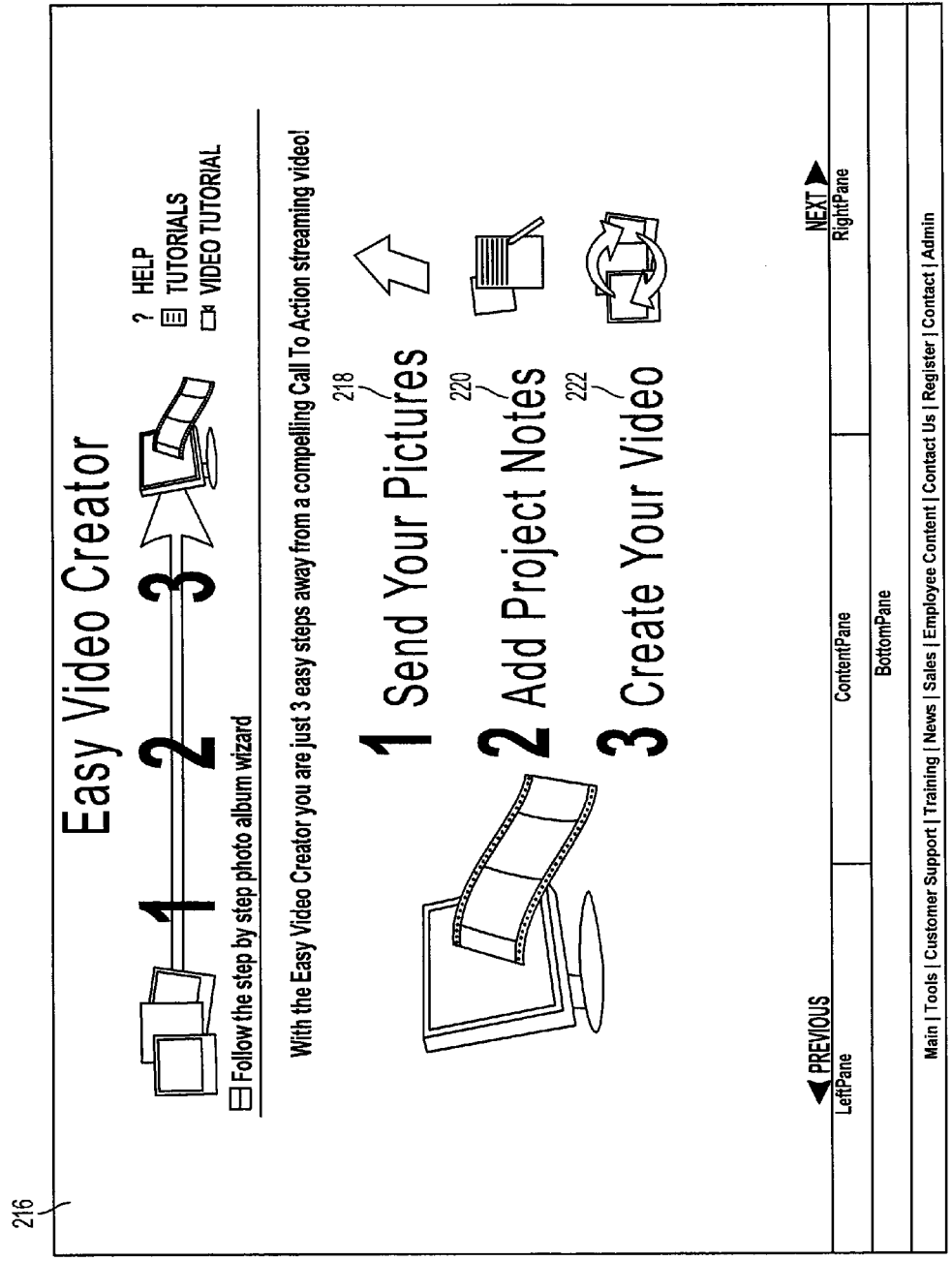
FIG. 3 is a screenshot of a start page of a user interface according to an embodiment of the present invention.

Once the customer selects a service from the order selection page 202, a start page 204 such as that depicted in FIG. 3 can appear. The start page 204 can list the steps which the customer must accomplish to begin the process of having a rich media video clip. The steps are uploading media source material 218, adding project notes 220, and creating and organizing the desired video content 222.

Figure 4:
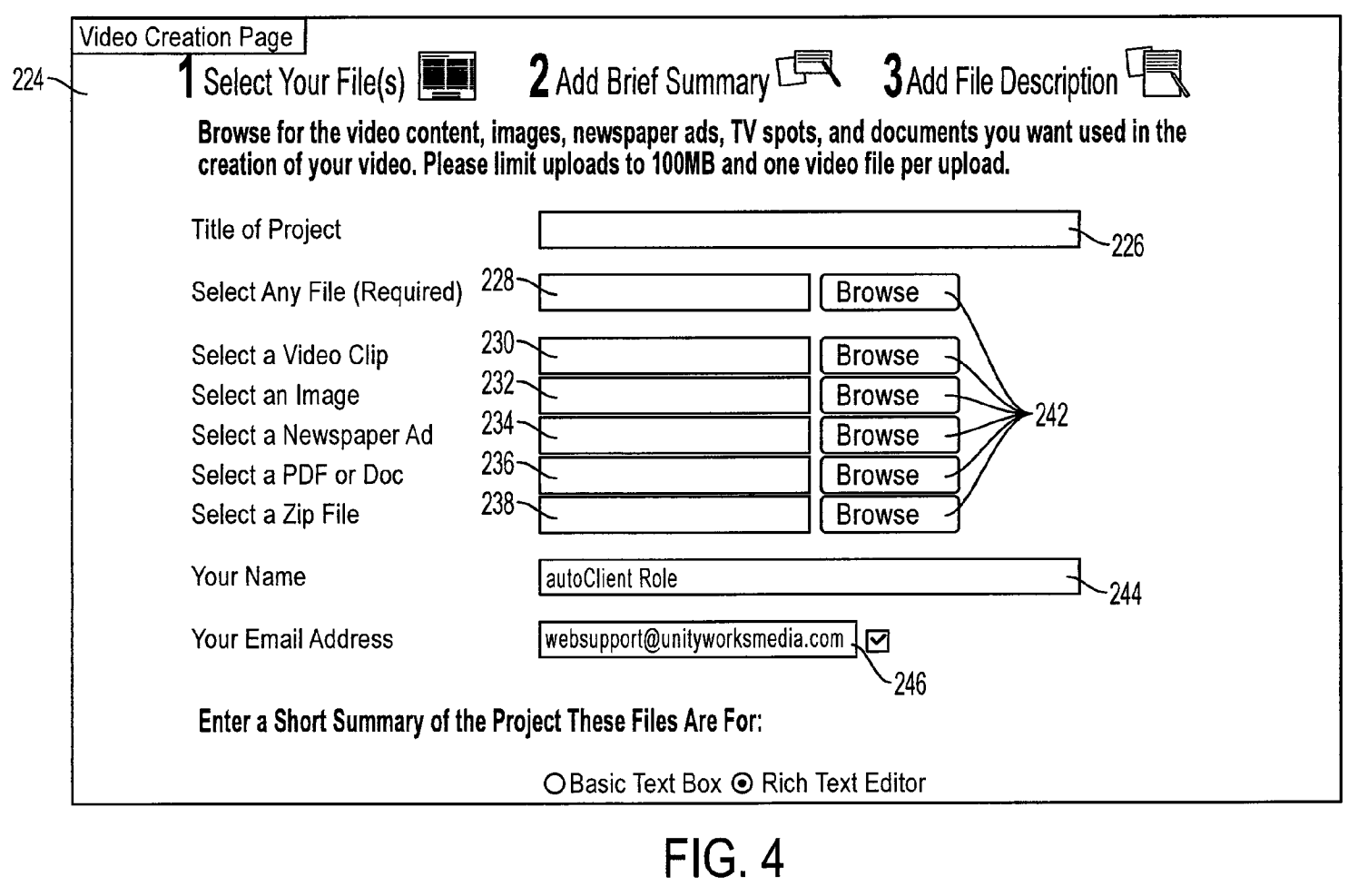
Figure 5:
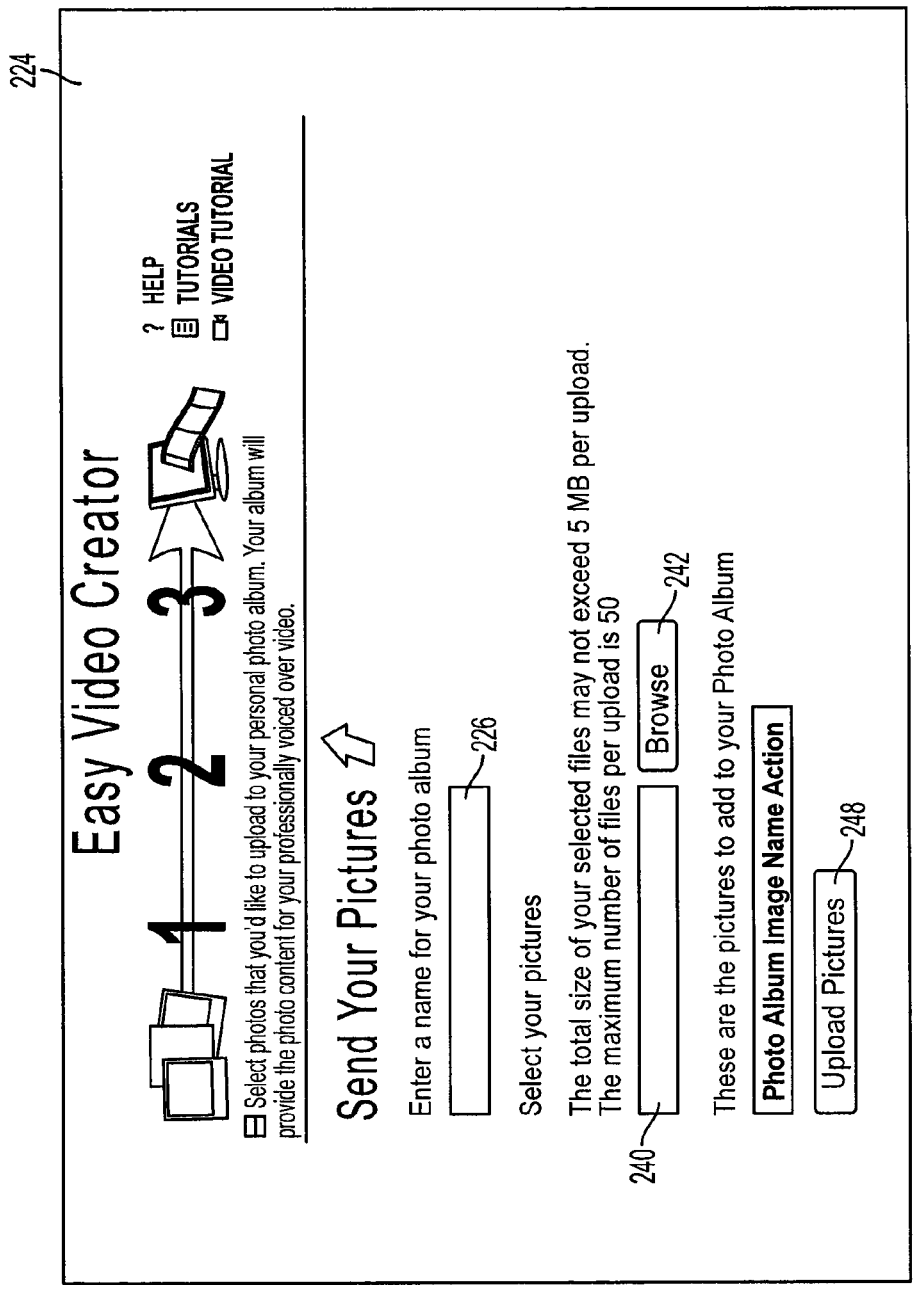
FIG. 5 is a screenshot of a file upload page of a user interface according to an embodiment of the present invention.
Figure 6:
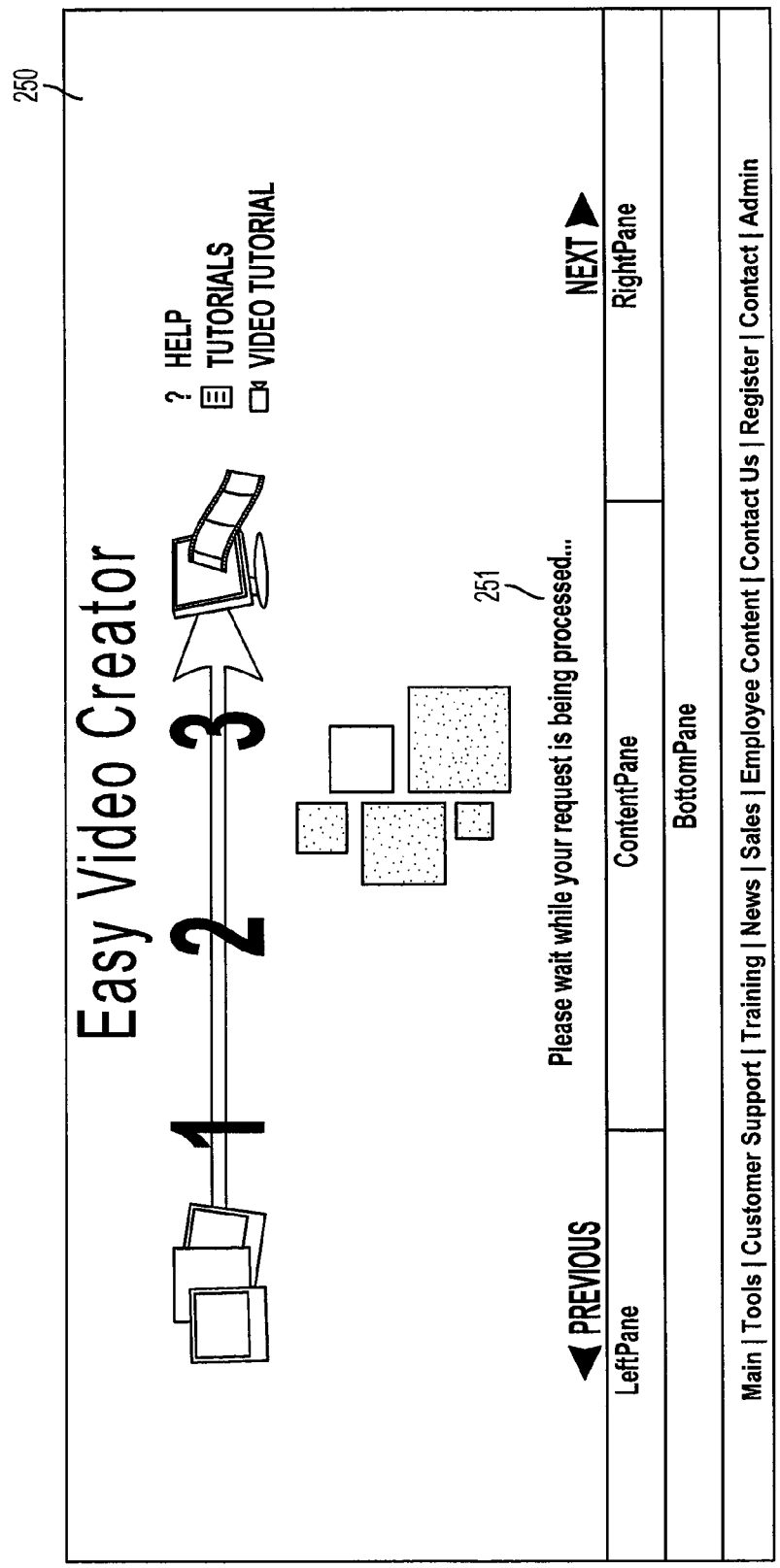
FIG. 6 is a screenshot of a processing screen of a user interface according to an embodiment of the present invention.

The customer can then advance to a file upload page 224, such as one of the file upload pages 224 depicted in FIGS. 4 and 5. File upload page can include a title box 226 for entering a name for the project. Depending on the type of project selected by the customer, various selection boxes 228-240 can appear on the file upload page 224. For example, an any file box 228, a video clip box 230, an image box 232, a newspaper ad box 234, a pdf or doc box 236, and a zip file box 238 can be present to allow for the uploading of the various listed file types. Alternatively, where only digital pictures are being uploaded, the file upload page 224 can include only a digital picture box 240 (FIG. 5). Each selection box 228-240 can include a browse button 242 to allow the customer to locate the desired file on the customer's system. The file upload page 224 can also include boxes into which the customer can insert its name 244 and email address 246. The selected files can be uploaded by pressing an upload files button 248.

As files are uploaded, a processing screen 250 (FIG. 6) may appear to display a processing message 251 to inform the customer that its files are in the process of being uploaded. As each file is uploaded, the upload file page 224 can be updated to reflect the uploaded files as shown in FIG. 7. The upload file page 224 can provide a list 252 of the uploaded files. The list 252 can include a thumbnail 254 and the name of the file 256 as well as the title of the project 258 that the file belongs to. A file can be removed from the list of uploaded files by use of a cancel or remove feature 260.

Figure 8:
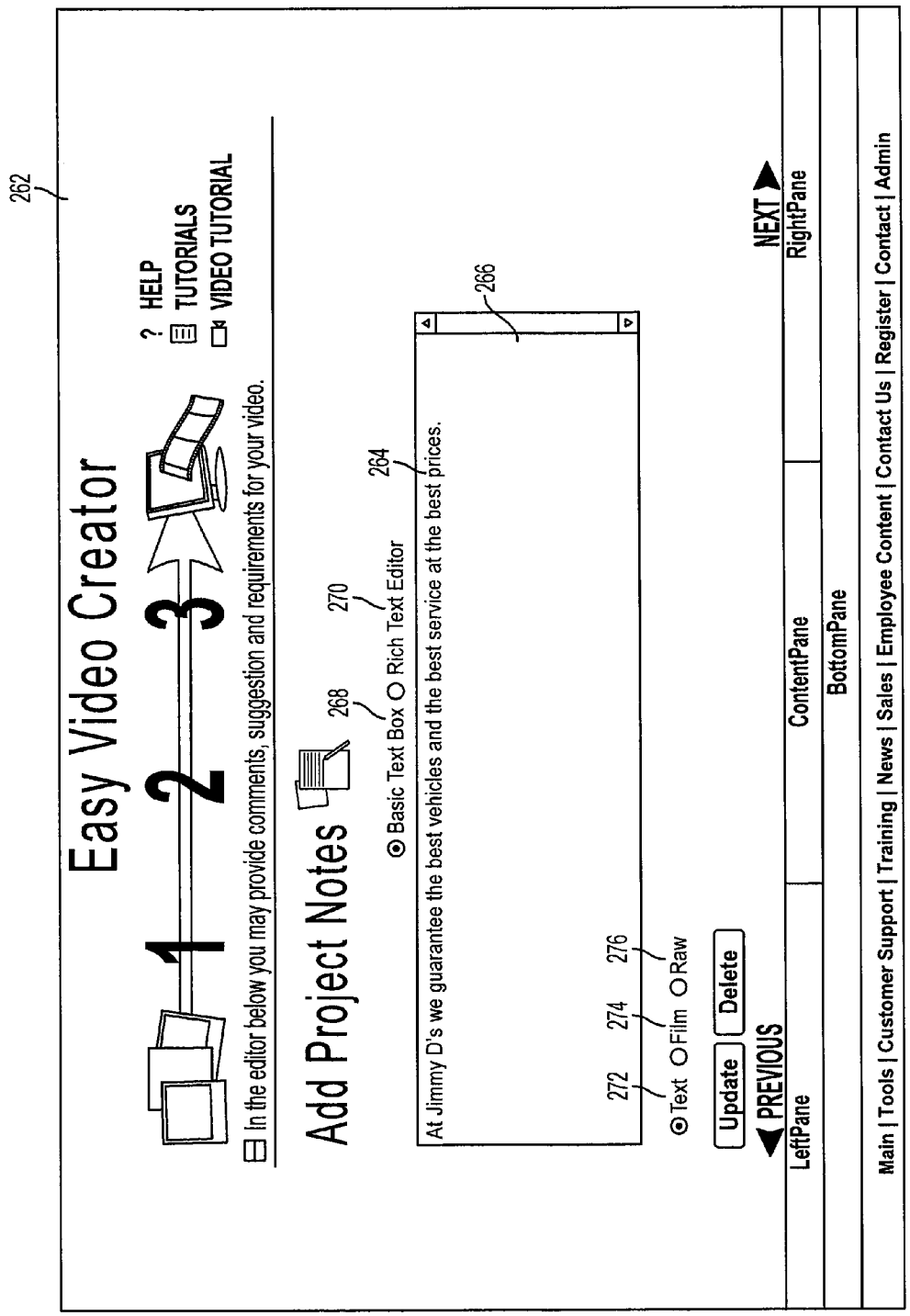
FIG. 8 is a screenshot of a project notes page of a user interface according to an embodiment of the present invention.

After the customer has uploaded all of the files it wishes to submit, the customer can move on to the add project notes step 220 at an project notes page 262 such as that depicted in FIG. 8. Project notes 264 can be added in a notes box 266. The project notes page 262 can allow the customer to select either a basic text box option 268 or a rich text editor option 270 for entering its project notes. The customer can also select from various data format options, such as a text option 272, an html option 274, or a raw option 276 to specify the format in which it wishes to enter the data that comprises its project notes.

Figure 9:
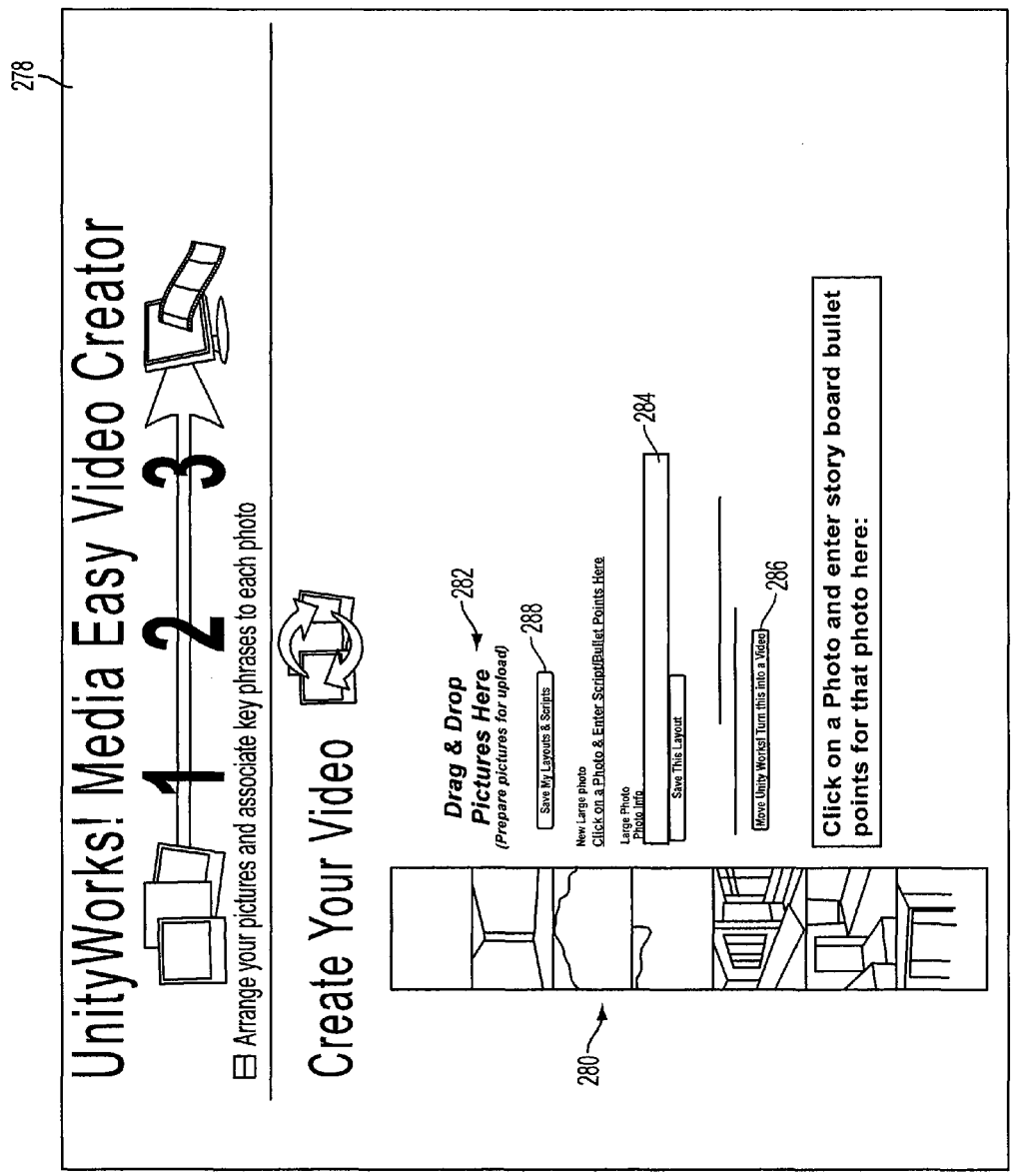
FIG. 9 is a screenshot of a create video page of a user interface according to an embodiment of the present invention.
Figure 10:
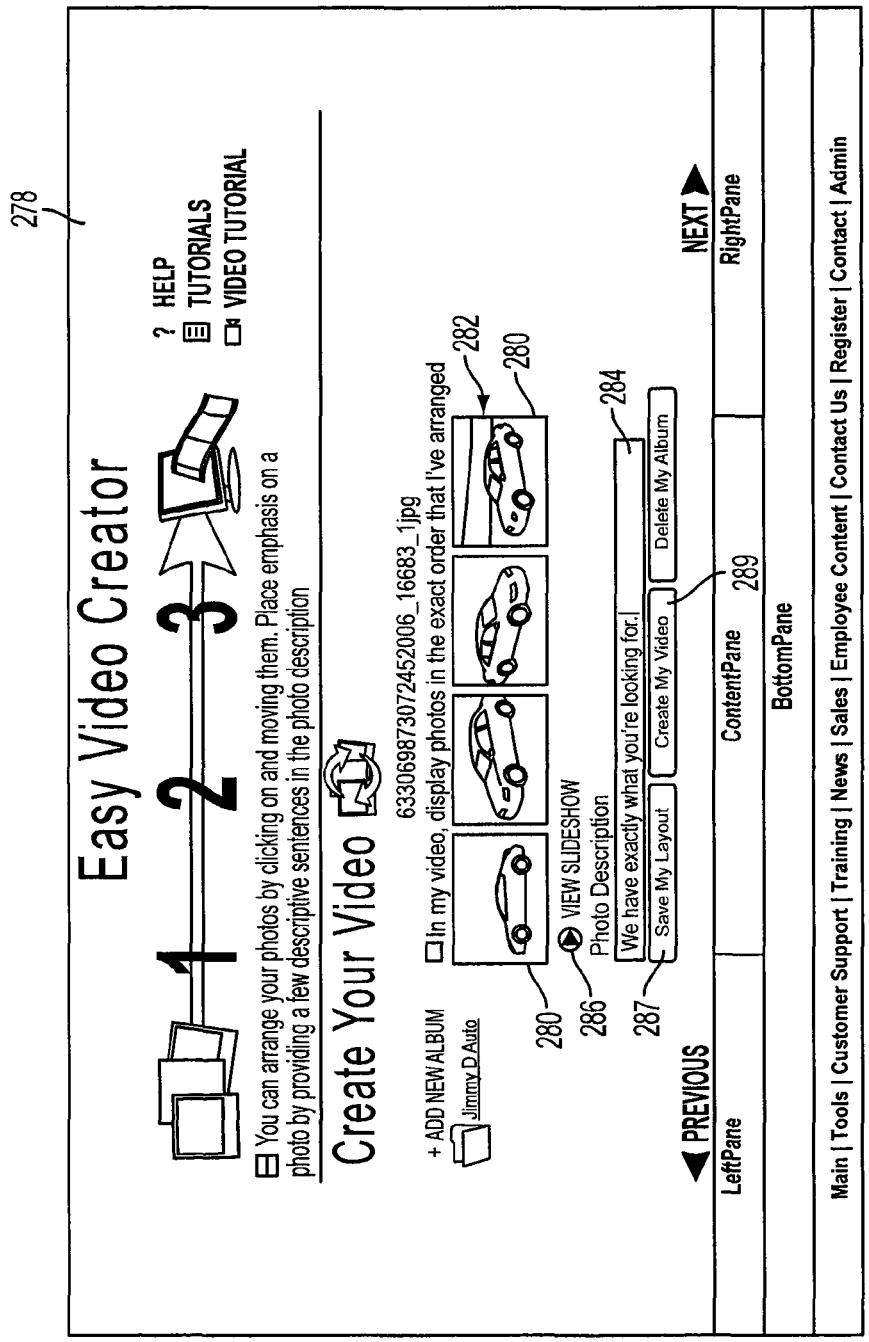
FIG. 10 is a screenshot of a create video page of a user interface according to an embodiment of the present invention.
Figure 11:
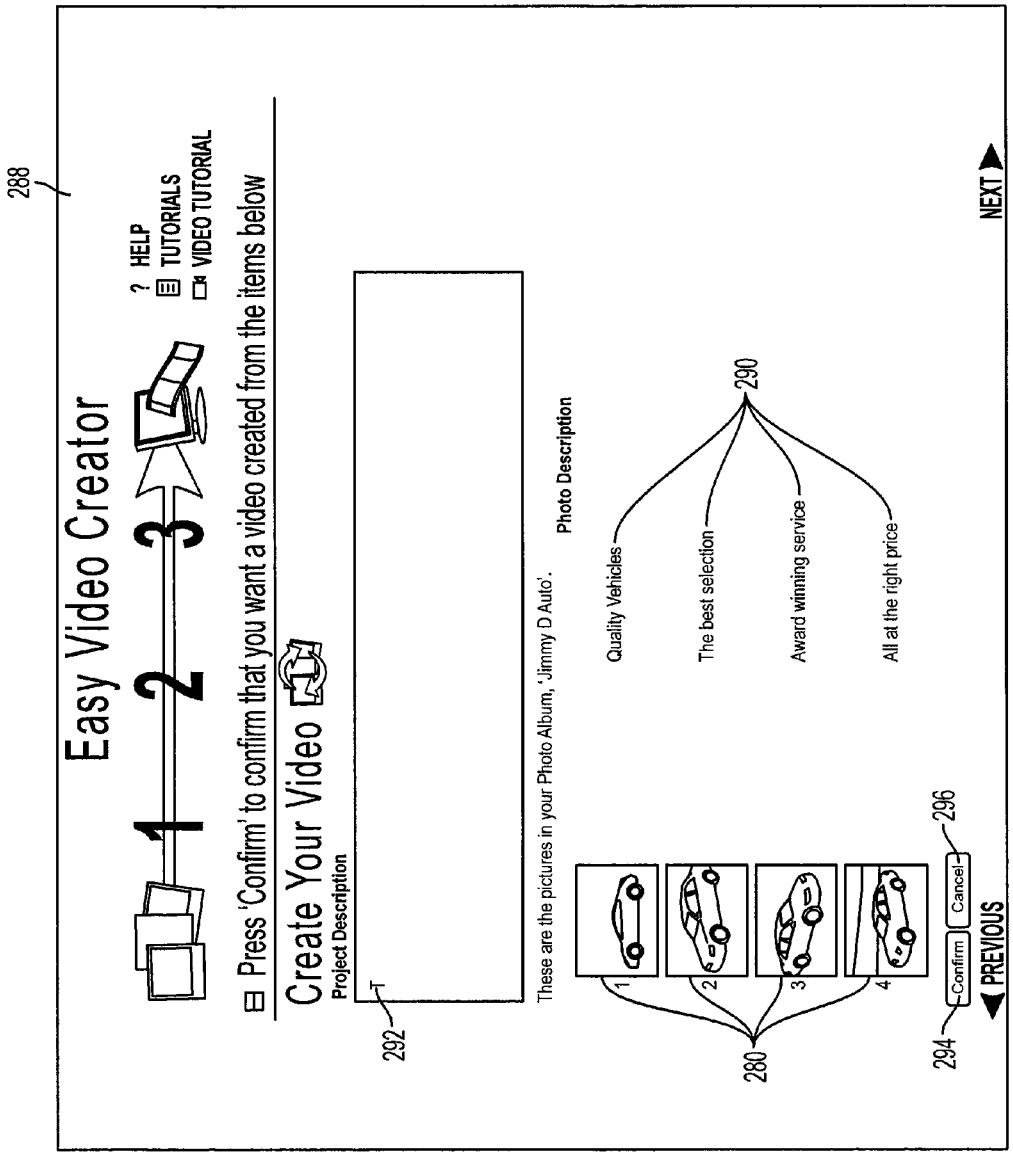
FIG. 11 is a screenshot of a create-video confirmation page of a user interface according to an embodiment of the present invention.

Referring now to FIGS. 9-11, once the customer has added its project notes, the customer can proceed to the step of creating its video 222. Where the customer has uploaded multiple files to be used in the creation of a video production, thumbnails 280 of the files can be put into the order the customer wishes them to appear in the rich media video clip on a create video page 278. The thumbnails 280 can be arranged by various methods, including dragging and dropping them in the desired order into a designated area 282 or by designating a number for each thumbnail 280 representing the order in which it is to appear. In one embodiment, a description can be associated with each file by clicking on the file's thumbnail 280 and entering text into a photo description box 284. The create video page 278 can also include a view slideshow link 286 that allows a customer to view a slideshow of its files in the selected order. The selected order can be saved with a save layout button 288. Once the customer is satisfied with the layout and description of its files, it can click on a create video link 289.

When the create video link 286 is selected, a create video confirmation page 288 can appear. Create video confirmation page 288 can include the thumbnail 280 of each file in the selected order. The description 290 associated with each file can be located adjacent to its respective thumbnail 280. The project notes 292 for the project can also be displayed on the create video confirmation page 288. The description 290 and project notes 292 can later be used to develop a script for a voiceover to be used with the rich media video clip. The customer can confirm an order by clicking the confirm button 294. If the customer wishes to change or cancel an order, the customer can click the cancel button 296.

Figure 12:
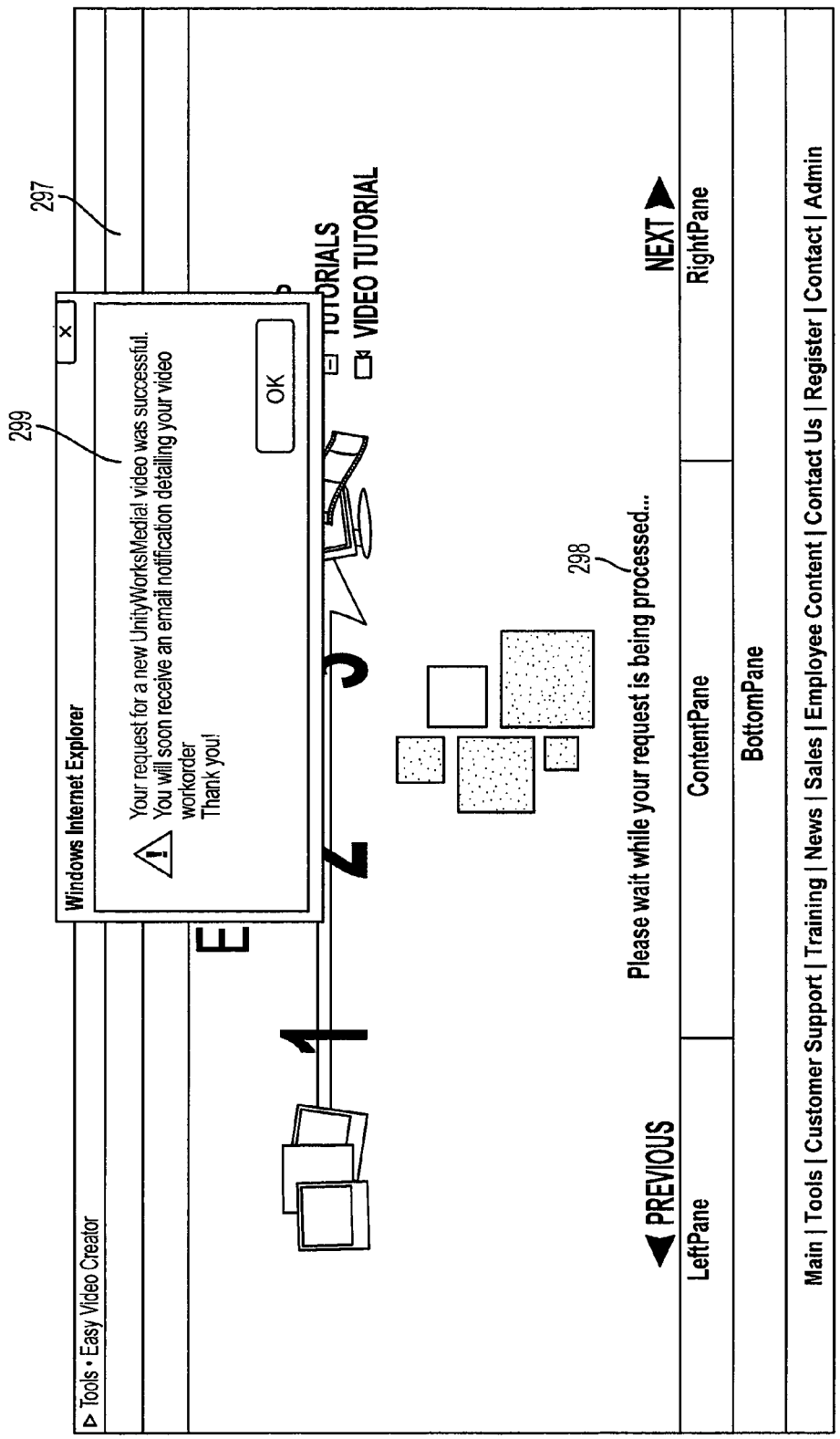
FIG. 12 is a screenshot of a processing page of a user interface according to an embodiment of the present invention.
Figure 13:
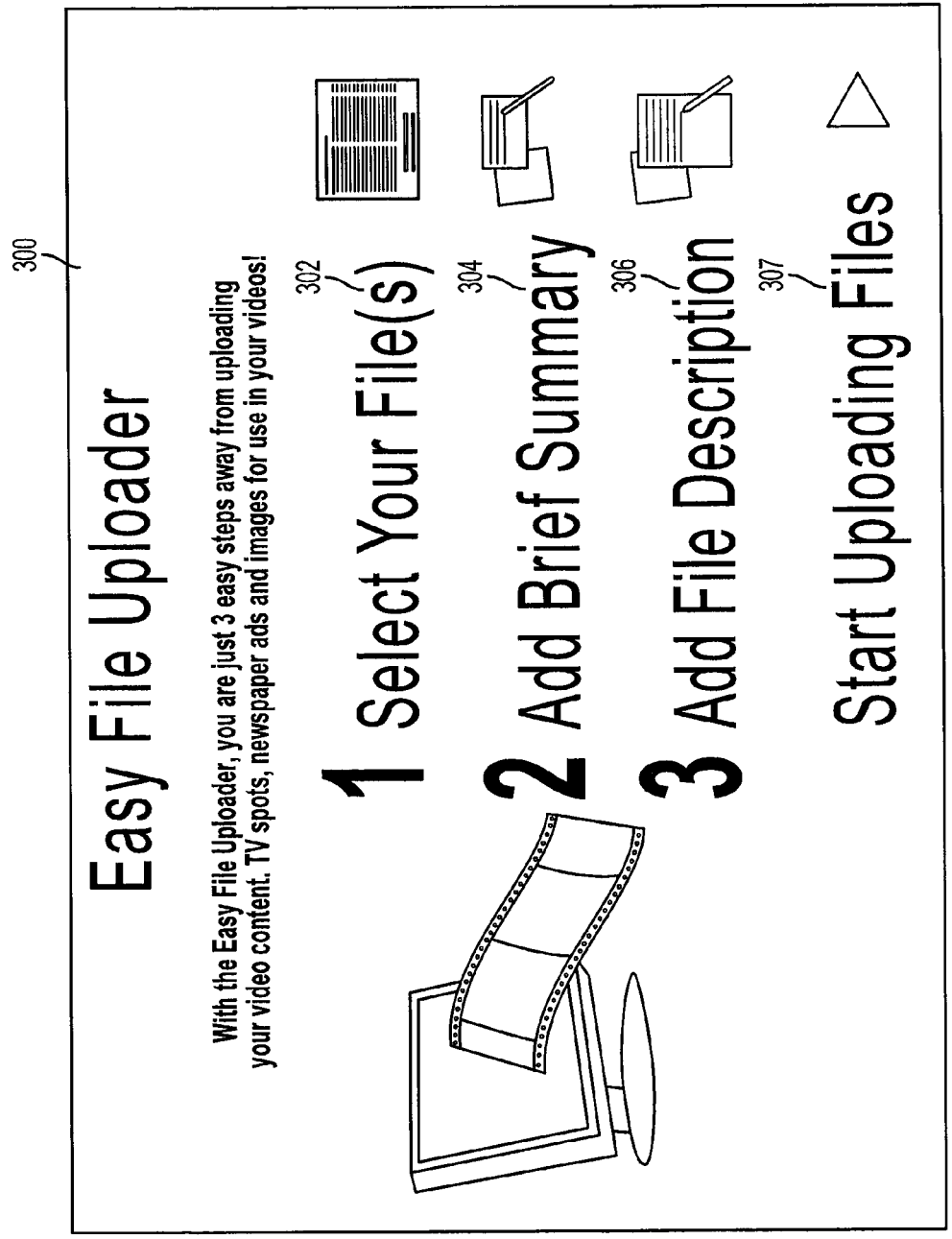
FIG. 13 is a screenshot of a file upload page of a user interface according to an embodiment of the present invention.

Once the customer has confirmed an order, a processing page 297 can appear with a message informing the customer that the order is being processed 298 while the order is communicated to the third party video producer (FIG. 12). Once the third party video producer has received the order, a pop-up confirmation message 299 can appear to confirm that the order has been received.

The above steps taken by the customer to submit files and instructions can be done in a sequential order in order to provide complete information to the third party video producer. This provides for a more organized submission and allows for faster video production by the third party video producer. Alternatively, the customer may complete only some of the steps. For example, the customer can access a file upload page 300 from which the customer only selects files for upload 302, adds a brief summary of the project 304, adds a description of the files 306, and uploads the files 307. The third party video producer will then fill in the gaps in the information received, such as project notes or arrangement of files, to create a rich media video clip. Similarly, if a customer submits files in an unorganized fashion, such as by attaching them to an email, the third party video producer will generate any additional information necessary to produce a rich media video clip.

Referring again to FIG. 1, the customer's instructions and uploaded media source material are transferred over a network 110 and received by a computerized content aggregator 130. The content aggregator 130 is programmed to review the various input from the customer and exercises logic to translate the input into appropriate work orders and production instructions for submission to the third party video producer.

In one embodiment, the computerized content aggregator 130 includes an automated production assistant 120 that is programmed to utilize various automated processes and libraries 122 to aid in organizing and serving up suggested video elements that the third party video producer can use to create a rich media video clip. The automated processes and libraries 122 can include pre-produced intro and outro segments designed for ads of the specific customer, clips, voiceovers, and script templates previously produced for the customer, and an automated script developer tool. The production assistant may also be programmed to access various databases that contain descriptive information uniquely identified with the product that is the subject of the customer's order.

In one example embodiment, a VIN database includes information about specific cars or an MLS database includes information about specific real estate properties. In such databases, a unique identifier corresponds to each item in the database. When the unique identifier is entered into the computerized content aggregator, the automated production assistant may be programmed to access these databases to obtain further information, such as description or images, on the features of the corresponding item. This information can then also be used in selecting and constructing the suggested video elements packaged for the third party video producer.

In another example embodiment, databases of the customer's products or services and prepared marketing and rich media materials, as well as databases of the customer's customer lists, may be automatically accessed and compared as part of the process executed by the automated production assistant. In another aspect of this embodiment, the completed rich media clips may be automatically emailed to a selected subset determined from the customer's customer database to match attributes corresponding to the particular work order used to generate the customized rich media clip. For example, the work order may specify that a recipient of the email containing the rich media clip may be entitled to a special offer on a new vehicle if they are willing to trade in their existing vehicle. In this example, the recipients may be selected from the customer list for those recipients who have an existing vehicle that matches the desired criteria of, for example, a used vehicle for which there is a current increased demand.

Figure 14:
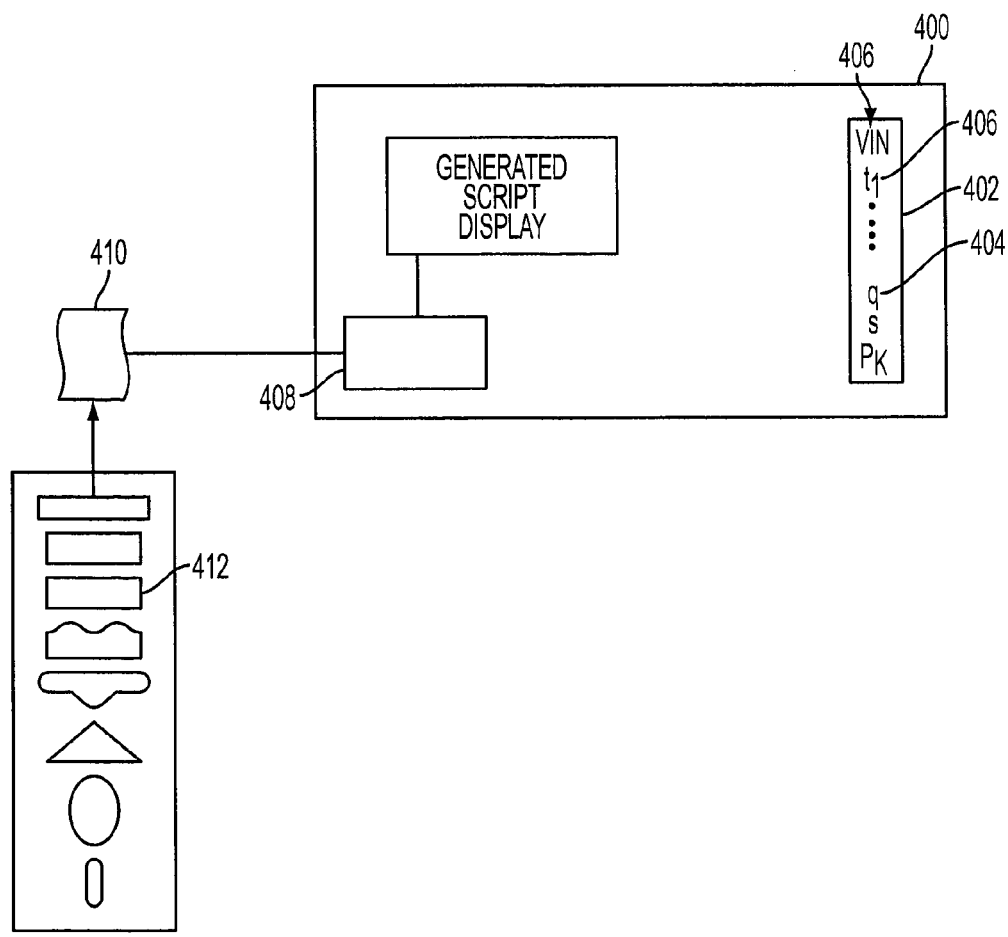
FIG. 14 is a block diagram illustrating the operation of the automatic script generator according to an embodiment of the present invention.

FIG. 14 is a block diagram illustrating the operation of one embodiment of the automatic script generator 400 that can be utilized by the automated production assistant 120. As seen in FIG. 14, block 402 represents a feature vector 404 for the rich media video clip after it is populated with select alphanumeric descriptors 406. The select alphanumeric descriptors are generated based on the file descriptions 290 submitted by the customer and/or the feature descriptions obtained from a proprietary database. In one embodiment, the automatic script generator 400 includes a natural language processor 408 communicating with a database 410 comprising a plurality of templates 412. Each template is a lexically meaningful sentence of connected words which include the alphanumeric descriptor or descriptors 406 corresponding to each file or feature description. Each file or feature may be associated with a plurality of templates and each template may represent a variant of a sentence in a selected language. Each variant of the sentence creatively conveys the essence of the associated file or feature with a slant tailored to a particular promotion related theme.

In one embodiment, a natural language processor 408 collects the set of sentences corresponding to the plurality of templates 412 associated with the alphanumeric descriptors 406 populating the feature vector 404 and generates a text message or script that is substantially grammatically correct by using natural language processing principles well known in the art. In one embodiment, the script is uploaded to a script library accessible to the automated production assistant 120 and catalogued for easy search using a search key derived from the feature vector 404. A future rich media video clip order that leads to an occurrence of the feature vector 404 may trigger the retrieval of script from the script library into computerized content aggregator 130 instead of triggering the automatic script generator 400.

The content aggregator 130 places the suggested video and script elements in a video creation project element file 140 which is transmitted to the third party video producer. A human operator 144 at the third party video producer can then import the video creation project element file 140 into a user interface 142. User interface 142 can be a user interface 144 of any known commercially available video production software, such as, for example, MovingPicture software from StageTools LLC. Alternatively, user interface 142 can be a user interface 500 of a proprietary video production software of the third party video producer.

Figure 15:
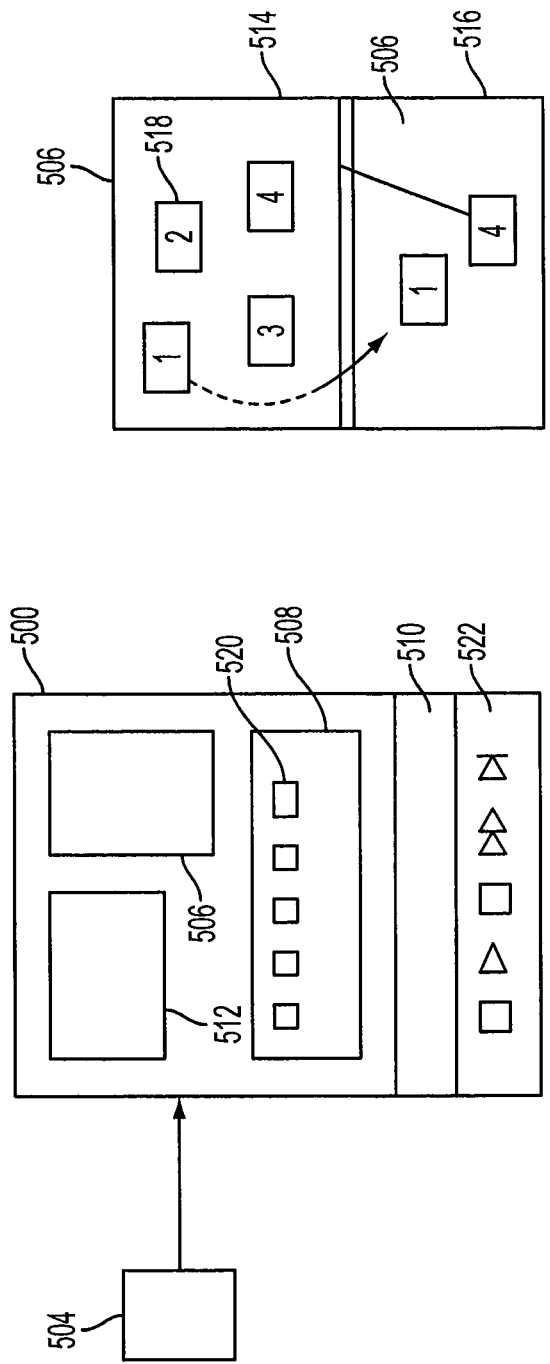
FIG. 15 depicts an edit mode of a user interface of an embodiment of the present invention.

FIG. 15 depicts an edit mode of a proprietary user interface 500 that provides the edit controls 502 necessary to affect the transformation of the selected video elements from the video creation project element file 140 into a rich media video clip. User interface 500 is provided with intuitive controls such that an operator 144 can quickly and efficiently produce a rich media video clip based on decisions made by the human operator 144, and in some embodiments, a customized voice over recorded by the human operator 144, without the need for specialized training.

In one embodiment, user interface 500 is configured with an input box 504 for operator input of an alphanumeric input representing a unique database identifier, a review area 506, a storyboarding area 508, playback area 510 and a teleprompter area 512. Review area 506 has a first region 514 and a second region 516. First region 514 presents the operator 144 with thumbnail icons 518 characterizing the selected video elements and script. Exemplary thumbnail icons 518 include a still images icon, a motion video icon, an audio track icon and a script track icon. The absence of one or more types of selected video elements may cause the icon 518 corresponding to that type of media to not display in the first region 514. Other equivalent means can be used to indicate the presence or absence of a particular component. Operator selection of, for example, the still images icon, causes the selected still digital photographs (i.e. frames) to display in the second region 516 of the review area 506. Operator 144 can construct a key frame set 520 by transferring (e.g. by dragging the frames) a selected number of the still digital photographs (or frames) to the storyboarding area 508. Operator selection of a motion video icon will cause a video vignette of the selected frames to play in the playback area 510. Playback controls 522 may also be used to adjust the frame speed and a rectilinear cursor may be used to grab a thumbnail 518 and cause it to be added to the key frame set 520. The operator 144 can edit the key frame set 520 by using intuitive frame-edit controls in the storyboarding area 508.

Editing software 550 can take as input the key frame set 520. In one embodiment of FIG. 16, the editing software 550 may be either linear or non-linear. In one embodiment, the editing software 550 is a component of a virtual 'studio in a box' hardware-software package, such as Creation Station solution by UnityWorks! Media, the assignee of the present invention. Creation Station comprises a video camera and green screen lights in addition to the editing software 550 and provides full video production, editing and streaming capabilities.

Figure 16:
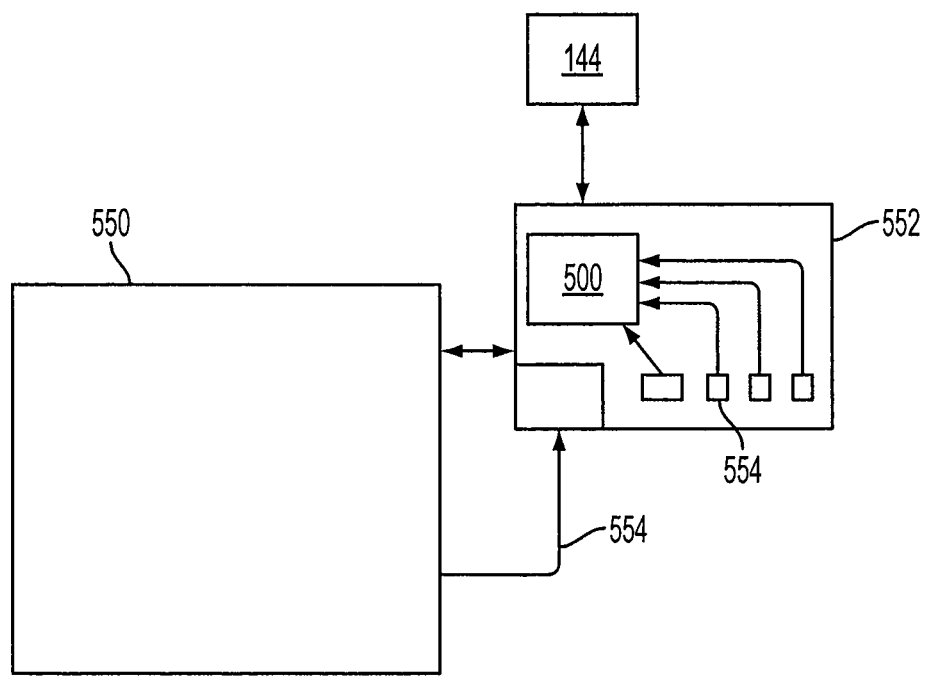
FIG. 16 is a diagram illustrating the editing software of an embodiment of the present invention.

In an example embodiment illustrated in FIG. 16, editing software 550 is operable in a semi-automatic mode, i.e. through the intermediation of the operator 144 interacting with the editing software 550 through the user interface 500 displayed on a display device 552 of a computer. The editing software 500 "stitches" still frames 554 or other video elements in the key frame set 520 into a rich media video clip by adding dynamic motion through a predefined set of motion-effects. Exemplary motion-effects include still, pan, tilt, zoom, cut, wipe, fade and dissolve. Each still frame is subjected to one or more of motion effects to create animated sub clips. In effect, each motion effect involves creating a sequence of sub-frames from the single frame representing the still frame. The sequence of sub-frames represent periodic snapshots of the view within a window bounding a limited region of the still frame while the window is 1) moved continuously in a horizontal direction over the still frame in either a left or a right direction (i.e. panning) and/or 2) tilted continuously up or down in a vertical direction (i.e. tilting) and/or 3) scaled continuously to zoom in and/or zoom out. Animated sub clips associated with the key frames may be "stitched" together into a rich media video clip through appropriate cuts, wipes, fades and dissolves. Finally, an intro segment can be pre-pended to the rich media video clip and an outro segment can be appended to the rich media video clip to generate a broadcast quality video.

In another embodiment, video editors such as Adobe Premiere or Avid Xpress DV may be used for rendering the combination of the rich media video clip, the intro segment and the outro segment into the broadcast quality video. The playback area 510 of the proprietary user interface 500 also provides the facility to render the video. The operator 144 may iteratively modify the video when needed using the editing software 550. In one embodiment, the editing software 550 is configured to adjust the media effects employed to generate the rich media video clip so that the total playtime of the broadcast quality video is less than about a minute, such as about 42 seconds.

Figure 17:
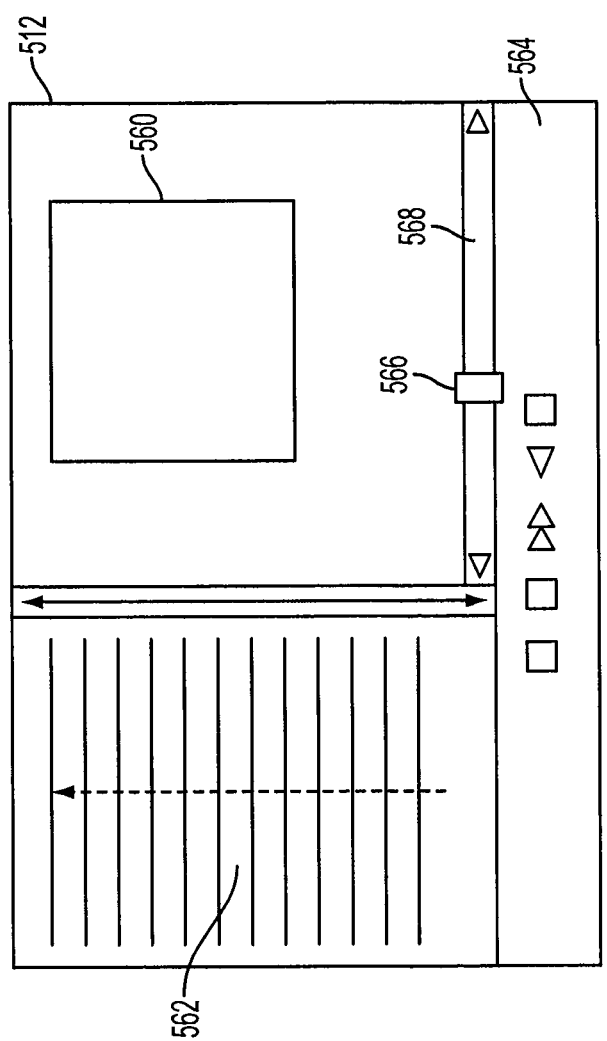
FIG. 17 depicts a teleprompter area of the editing software according to an embodiment of the present invention.

FIG. 17 exemplifies one embodiment of a teleprompter area 512. Upon operator activation of the audio track icon 560, the script 562 generated by the automated production assistant 120 is displayed in the teleprompter area 512. User activated controls 564 in the teleprompter area 512 may be used to adjust the rate at which the script 562 may be displayed or scrolled, for example. A slider control 566 is provided where the length of the slot 568 represents 100% of the time duration to scroll the current script 562 in its entirety. The slider control 566 can be moved left or right by the operator 144 to vary the time at which playback of the video is automatically initiated relative to the scrolling duration of the script 562.

In one embodiment, the operator, such as a person who has been professionally voice trained, reads the script 562 as it scrolls in the teleprompter area 512 to create a voice-over capsule. Operator selection of a voice over icon in the user activated controls 564 initiates a recording of the operator's voice. The playback of the video contemporaneous with the scrolling of the script 562 provides a visual cue to help the operator adjust the pace of delivery and the tone of voice to the contents of the video. Once recorded, the voice-over capsule may be replayed to synchronize it with the video. The editor software 550 combines the audio of the voice-over capsule with the video of the rich media promo to generate a broadcast quality advertisement.

In an alternate embodiment, the voice-over capsule is created before the creation of the rich media video clip and the duration of the audio in the voice-over capsule defines the total playtime of the rich media promo. Irrespective of whether the voice-over capsule is created before or after the rich media promo, the total time it takes the operator 144 to create a broadcast quality advertisement is less than about ten minutes and in one embodiment is less than two to three minutes.

Figure 18:
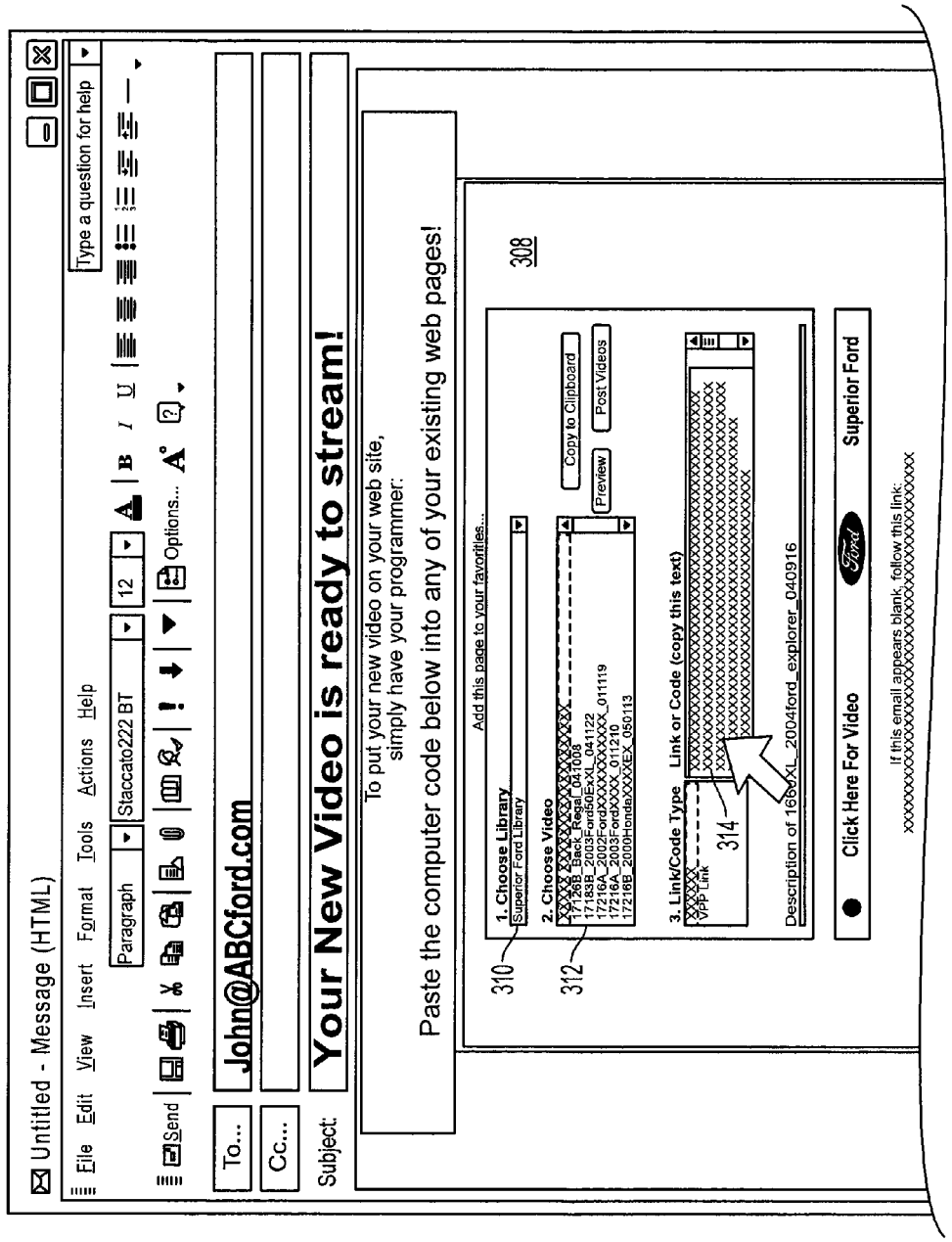
FIG. 18 is a notification email according to an embodiment of the present invention.
Figure 19:
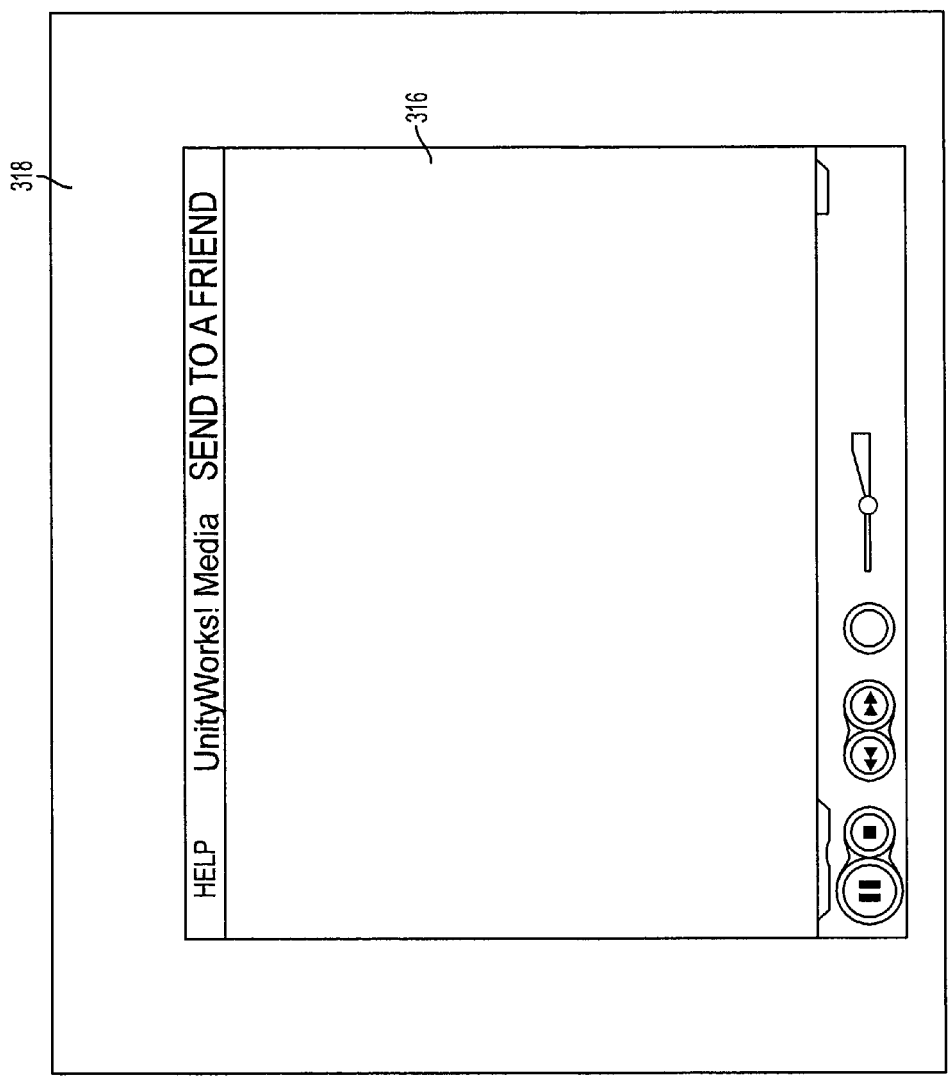
FIG. 19 is a customer webpage displaying a broadcast quality advertisement according to an embodiment of the present invention.

Upon completion of the broadcast quality advertisement, the third party video producer can send an email 308 to the customer to notify it that its order has been completed (FIG. 18). Within the email 308, the customer can select a specific video 312 from a specific customer library 310 to display the source code 314 for the advertisement. The customer can then embed the source code 314 within its website 318 to allow the display of its broadcast quality advertisement 316 (FIG. 19). In an alternate embodiment, the email may contain either 1) an iframe code that may be inserted by the customer into a web page such that the page may be served up by the customer, or 2) a link to the rich media clip. In another embodiment, the third party video producer may be contracted to promulgate emails containing the rich media clip, such as, for example, by incorporating an iframe or link to the rich media clip in an email as described in U.S. patent application Ser. No. 11/059,315, the disclosure of the detailed description of the invention which is hereby incorporated by reference other than the express definitions contained therein.

Referring now to FIG. 20 there can be seen another diagram illustrating a method and system for high quality semi-automatic production of customized rich media video clips according to an embodiment of the present invention. The various elements of the diagram identified by the various reference characters have already been described in reference to the previous Figures.

The above description of the disclosed embodiment is provided to enable any person skilled in the art to make or use the invention. Various modifications to these embodiments will be readily apparent to those skilled in the art, and the generic principles described herein can be applied to other embodiments without departing from the spirit and scope of the invention which is limited by nothing other than the appended claims.

The invention claimed is:

1. A method implemented on a computer having a processor, a storage, and a communication platform connected to a network for producing a customized rich media video clip describing a product, comprising the steps of:

receiving a request related to a product to prepare a customized rich media video clip that describes the product;

obtaining, by an automated production assistant based on the request, one or more rich media video clip segments each of which describes at least one aspect of the product;

selecting one or more script templates based on the at least one aspect of the product described in the at least one video clip segment to create a voice-over audio element for at least one of the video clip segments in accordance with a script that is automatically generated based on the one or more script templates, wherein each of the one or more script templates includes text describing a specific feature of the product;

generating, by a content aggregator, the rich media video clip by automatically stitching together the rich media video clip segments in accordance with the voice-over audio element in such a manner that the aggregated rich media video clip seamlessly presents different specific features of the product in a concatenated manner and synchronized with the voice-over audio element; and transmitting the rich media video clip as a response to the request.

2. The method of claim 1, wherein the script is generated based on the product specified in the request.

3. The method of claim 1, wherein at least a portion of the script has been previously stored in at least one of the templates and is retrieved for recording by having the script read by a human operator.

4. The method of claim 1, wherein at least one of the rich media clip segments corresponds to an intro segment.

5. The method of claim 1, wherein at least one of the rich media clip segments corresponds to an outro segment.

6. A method implemented on a computer having a processor, a storage, and a communication platform connected to a network for producing a customized rich media video clip describing a product, comprising the steps of:

receiving a request related to a product to prepare a customized rich media video clip that characterizes the product;

obtaining, by an automated production assistant based on the request, one or more rich media video clip segments each of which describes at least one aspect of the product;

selecting one or more script templates based on the at least one aspect of the product described in one or more rich media clip segments, wherein each of the script templates includes text describing at least one specific feature of the product;

automatically generating, with respect to at least one obtained rich media video clip segment, a script characterizing the product based on the one or more script templates; where the script is to be used to create a voice-over audio element;

generating, by a content aggregator, the customized rich media video clip by automatically stitching together the one or more rich media video clip segments and assembling the rich media video clip segments in accordance with the voice-over audio element in such a manner that the aggregated rich media video clip seamlessly presents different specific features of the product in a concatenated sequence and synchronized with the voice-over audio element; and transmitting the rich media video clip as a response to the request.

7. The method of claim 6, wherein at least one of the rich media video segments is without a script.

8. The method of claim 7, wherein the rich media video clip segment for which no script is generated corresponds to an intro segment.

9. The method of claim 7, wherein the rich media video clip segment for which no script is generated corresponds to an outro segment.

* * * * *